US012712812B1

(12) United States Patent
Levin et al.

(10) Patent No.: US 12,712,812 B1
(45) Date of Patent: Aug. 18, 2026

(54) CONGESTION CONTROL USING HIERARCHICAL MATCH ACTION TABLE FRAMEWORK

(71) Applicant: Amazon Technologies, Inc., Seattle, WA (US)

(72) Inventors: Anna Levin, Haifa (IL); Leah Shalev, Zikhron Ya'Aqov (IL); Hani Ayoub, Majd Al Kurum (IL); Barak Farbman, Ramat Yishai (IL)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 18/478,114

(22) Filed: Sep. 29, 2023

(51) Int. Cl.
*H04L 47/12* (2022.01)
*H04L 43/0864* (2022.01)

(52) U.S. Cl.
CPC .......... *H04L 47/12* (2013.01); *H04L 43/0864* (2013.01)

(58) Field of Classification Search
CPC ............................ H04L 47/12; H04L 43/0864
See application file for complete search history.

(56) References Cited

U.S. PATENT DOCUMENTS 10,986,027 B1 * 4/2021 Sears .................. H04L 12/4641
2003/0223362 A1 * 12/2003 Mathews ................ H04L 47/29 370/412
2012/0155258 A1 * 6/2012 De Vleeschauwer .. H04L 47/83 370/230
2013/0212251 A1 * 8/2013 Lipman ............. H04W 28/0247 709/224
2013/0329632 A1 * 12/2013 Buyukkoc ............... H04L 43/16 370/328
2014/0269326 A1 * 9/2014 Westin .................... H04L 47/24 370/237
2020/0367096 A1 * 11/2020 Hwang ............. H04W 28/0289

* cited by examiner

*Primary Examiner* — Abdulkader M Alriyashi
(74) *Attorney, Agent, or Firm* — Weaver Austin Villeneuve & Sampson LLP

(57) ABSTRACT

Metrics associated with the traffic on a network are received to perform congestion control. The metrics are compared with a set of conditions to look up a case entry for a current state of the congestion control in a case definition table of a hierarchical match action table framework. A state of the congestion control is updated to a next state indicated in the case entry of the match action table. One or more congestion control actions corresponding to the case entry are performed.

20 Claims, 8 Drawing Sheets

| Case Definition Table 106 | | | | | | | |
|---|---|---|---|---|---|---|---|
| State 106A | Case 106B | Conditions 106C | | | | | Next state 106D |
| | | Transmission Rate | Re-Transmt Rate | Inflight Packets | | Round trip time | |
| Slow_start | Case 1 | Cond 11 | Cond 12 | Cond 13 | . . . | Cond 1Y | Steady |
| Slow_start | Case 2 | Cond 21 | Cond 22 | Cond 23 | . . . | Cond 2Y | State D |
| . . . | . . . | . . . | . . . | . . . | . . . | . . . | . . . |
| Slow_start | Low packets inflight | normal | any | low | . . . | any | Slow_start |
| Steady | Dropped packets | normal | high | any | . . . | any | Draining |
| Steady | Case 3 | Cond 31 | Cond 32 | Cond 33 | . . . | Cond 3Y | Steady |
| Steady | Case 4 | Cond 41 | Cond 42 | Cond 43 | . . . | Cond 4Y | State C |
| . . . | . . . | . . . | . . . | . . . | . . . | . . . | . . . |
| State C | Case 5 | Cond 51 | Cond 52 | Cond 53 | . . . | Cond 5Y | State D |
| State C | Case 6 | Cond 61 | Cond 62 | Cond 63 | . . . | Cond 6Y | State C |
| . . . | . . . | . . . | . . . | . . . | . . . | . . . | . . . |
| State D | Case 7 | Cond 71 | Cond 72 | Cond 73 | . . . | Cond 7Y | Slow_start |
| State D | Case 8 | Cond 81 | Cond 82 | Cond 83 | . . . | Cond 8Y | Steady |
| . . . | . . . | . . . | . . . | . . . | . . . | . . . | . . . |

FIG. 3

| NORMAL TRANSMISSION RATE CONDITION TABLE 400 | | |
|---|---|---|
| NORMAL TRANSMISSION RATE (SLOW-START, | CASE 1, | >85% OF LIMIT) |
| NORMAL TRANSMISSION RATE (SLOW-START, | LOW PACKETS INFLIGHT, | >70% OF LIMIT) |
| NORMAL TRANSMISSION RATE (STEADY, | DROPPED PACKETS, | >90% OF LIMIT) |
| NORMAL TRANSMISSION RATE (STEADY, | CASE 4, | X% OF LIMIT) |
| NORMAL TRANSMISSION RATE (STEADY, | CASE 5, | Y% OF LIMIT) |
| NORMAL TRANSMISSION RATE (PROBING-UP, | CASE 6, | Y% OF LIMIT) |
| NORMAL TRANSMISSION RATE (DRAINING, | CASE 7, | X% OF LIMIT) |

FIG. 4

| UPDATE RATE ACTION TABLE 500 | | |
|---|---|---|
| UPDATE RATE (STEADY, | CASE 1, | UPDATE PARAMETERS A, X) |
| UPDATE RATE (STEADY, | CASE 2, | UPDATE PARAMETERS B, X) |
| UPDATE RATE (STEADY, | CASE 3, | UPDATE PARAMETERS A, Y) |
| UPDATE RATE (PROBING-UP, | CASE 4, | UPDATE PARAMETERS B, X) |
| UPDATE RATE (DRAINING, | CASE 5, | UPDATE PARAMETERS B, Z) |
| UPDATE RATE (DRAINING, | CASE 6, | UPDATE PARAMETERS A, Z) |

FIG. 5

CONGESTION CONTROL USING HIERARCHICAL MATCH ACTION TABLE FRAMEWORK

BACKGROUND

Network devices are used to exchange traffic among various nodes over a network. In some instances, network congestion may occur due to traffic overload, insufficient network bandwidth, malfunctioning devices or links, or misconfiguration, among other causes. Network congestion may cause loss of packets, or higher latency for packet transfers, which can reduce the quality of service and degrade the system performance. Some network devices may monitor the traffic on the network and perform certain measurements associated with the traffic, which can be used to control the network congestion.

BRIEF DESCRIPTION OF THE DRAWINGS

Various embodiments in accordance with the present disclosure will be described with reference to the drawings, in which:

FIG. 3 illustrates an example implementation of a case definition table in a hierarchical match action table framework, according to some embodiments;

FIG. 4 illustrates an example of a condition table in a hierarchical match action table framework, according to some embodiments;

FIG. 5 illustrates an example of an action table in a hierarchical match action table framework, according to some embodiments;

DETAILED DESCRIPTION

Figure 1:
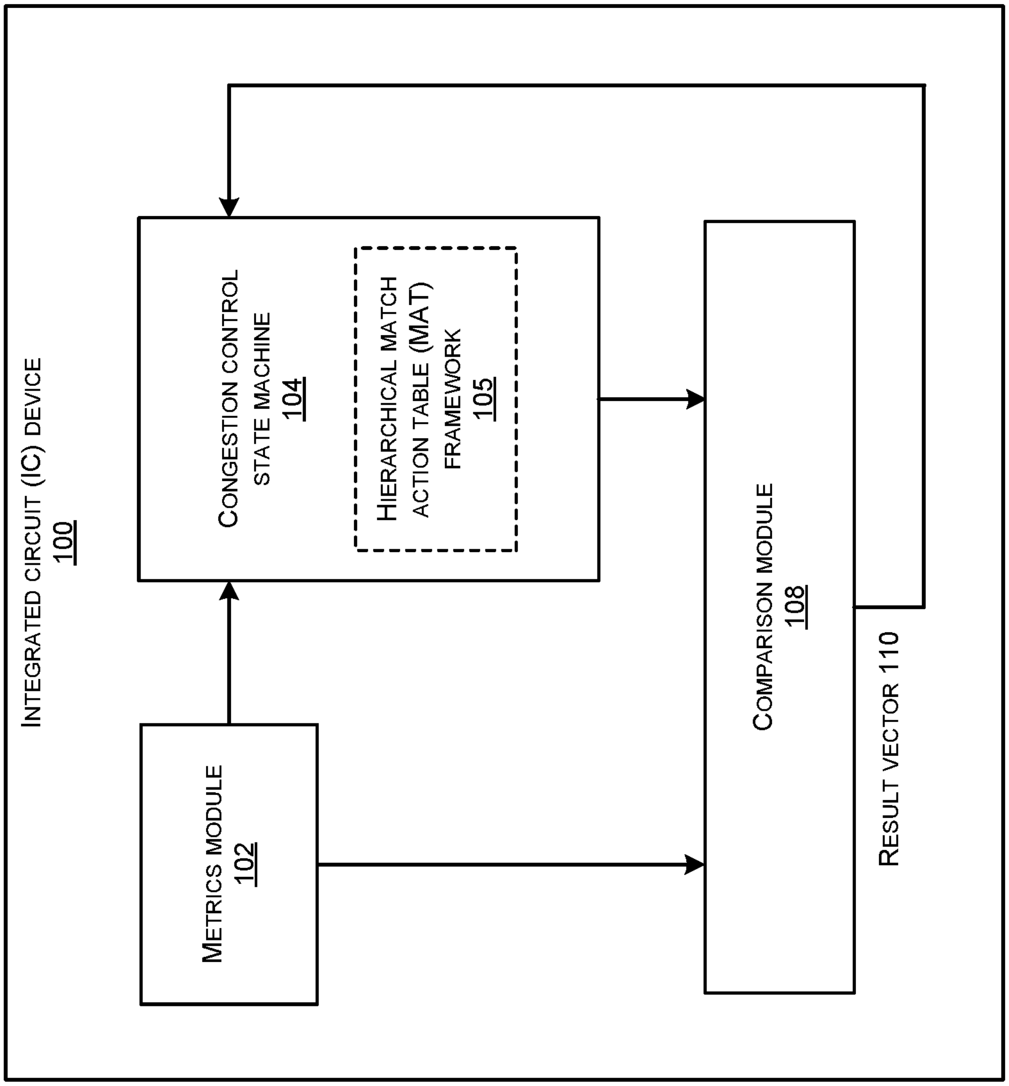
FIG. 1 illustrates an integrated circuit (IC) device that can perform congestion control according to some embodiments.

Traffic between various nodes on the network may include different packet types (e.g., data packet, control packet, acknowledgement (ack) packet, etc.) that may be associated with different applications executing on the nodes. The nodes may include servers, computing devices, processors, or other types of devices that may exchange data over the network. In most cases, the transmitter (TX) side may send a packet to the receiver (RX) side over the network using respective network interfaces based on a suitable transport layer protocol. Some example transport layer protocols may include Scalable Reliable Datagram (SRD), Transmission Control Protocol (TCP), or User Datagram Protocol (UDP). The RX side may respond with an ack indicating the receipt of the packet. The time it takes for a packet to arrive from the TX side to the RX side, and the time it takes the TX side to receive an ack or feedback from the RX side for the packet is called a round-trip time (RTT) or round-trip delay. In some cases, high RTT values may indicate high network latency or congestion on the network.

In some cases, network congestion may occur when some nodes are not able to process the incoming traffic at the rate at which the packets are being received. For example, when the transmission rate is higher than the capacity of a node, its internal buffer starts filling up, and some packets may be dropped. In some implementations, missing packets can be detected using a retransmission timeout mechanism. For example, a timer can be used to track whether an ack is received for a transmitted packet before the timer expires. The TX side may retransmit the missing packets after detecting the retransmission timeout. In some cases, frequent retransmission of packets may also contribute to congestion on the network. In some cases, an ack rate can be used to indicate the rate at which each packet was acknowledged by the RX side in response to the number of packets sent by the TX side. A low ack rate may indicate that there are a large number of packets or bytes inflight that have not been acknowledged, which may also contribute to the network congestion.

Some network devices may perform certain measurements associated with the network traffic, which can be used to derive network related metrics to perform congestion control. Some examples of network related metrics may include transmission rate of packets, ack rate of packets, RTT, number of dropped packets, number of packets inflight, and/or number of bytes inflight, etc. In some implementations, different network related metrics may be compared against corresponding thresholds or limits to detect congestion, e.g., the RTT or the number of packets inflight being higher than an expected value may indicate network congestion. The thresholds or limits may be configured based on the number of nodes in the network, capacity of the nodes, network bandwidth, link capacity, and the protocol used for communication, among other factors.

In some implementations, the congestion control can be represented using a large number of nested conditional statements (e.g., if-else statements) to detect different congestion scenarios by comparing the network related metrics against different combinations of conditions. For example, a condition may include a function that compares a metric with a threshold or a limit. In some cases, translating a long chain of if-else statements into hardware can be a cumbersome task and can be prone to errors. Once hardcoded, it is also difficult to tune the conditions to make adjustment to the congestion control. Thus, new techniques are needed for a modular and scalable architecture that can also provide consistency between hardware and software implementations for future expansions.

Techniques described herein can be used to perform congestion control using software and/or hardware implementation based on input data associated with the network related metrics. The network related metrics may include latency metrics, rate metrics, and inflight metrics associated with the traffic on the network, which can be derived based on various measurements performed in each phase of the traffic. In some examples, a phase may include multiple round-trip time of packets (e.g., packet and return ack). The network related metrics may also include metrics obtained from remote devices (e.g., measurements taken by remote devices, timestamps from remote devices, etc.), and/or device status information of the local and remote devices (e.g., processor utilization, memory utilization, and/or other information that may affect the amount of traffic a device can handle at a certain point in time, etc.).

A plurality of states of congestion control can be defined, which may include an idle state, a slow-start state, a steady state, a probing-up state, and a draining state. The network related metrics can be used to determine changes in the states, and actions to be performed to detect and control congestion on the network. In various embodiments, conditions of different network related metrics, and actions to be performed for congestion control can be standardized for each state of congestion control in a hierarchical match action table framework. This framework can provide modularity and expandability of the conditions and actions for congestion control. As a result, software implementations of the congestion control can be readily ported to hardware accelerated implementations.

The hierarchical match action table framework can be implemented using a set of nested tables that describe the congestion control state machine in high-level human readable format. The hierarchical nature of the match action table framework supports addition of conditions and actions. The hierarchical match action table framework can include a case definition table that defines different cases or scenarios and the state transitions for each state of the congestion control state machine. The case definition table can be easily translated from a software implementation to a hardware accelerated implementation to reduce development cycle time. The hierarchical match action table framework also includes condition tables that allow customization of conditions per state-case pair instead of using the same conditions and values for all state-case pairs, while still sharing a common library of conditions and parameters to choose from for each condition. The hierarchical match action table framework also includes action tables that allow customization of actions to take per state-case pair. The modular nature of the nested tables can also lower the blast radius of changes as each state-case pair gets a specific implementation.

As mentioned above, the case definition table can include a plurality of case entries for each of a plurality of states of the congestion control. Each case entry may contain a state-case pair specifying a case of a particular state of the congestion control, a set of conditions designated for the case of the case entry, and a next state of the congestion control. The set of conditions may be used to compare transmission rates, ack rates, packets or bytes inflight, RTT, retransmission timeouts, etc. The received network related metrics can be compared with a plurality of conditions to identify a case entry in the case definition table. The state of the congestion control can be updated to the next state based on the identified case entry. A set of congestion control actions can be performed to update network traffic goals and limits corresponding to the state-case pair of the identified case entry. For example, new limits of the rate or packets inflight can be set to manage congestion.

As mentioned above, the techniques described herein can also provide common code structure and parameters between hardware and software implementations. For example, in some embodiments, the nested tables in the hierarchical match action table framework can be translated into hardware implementations, for example, by using a bit mask per case entry to select relevant compare operations. The network related metrics can be compared with each condition specified in the case definition table to generate a result vector. A corresponding bit mask can be applied to the result vector for each case entry to identify a case entry with matching conditions. The action to be performed for congestion control can be determined based on the identified case entry.

As another example, the nested tables in the hierarchical match action table framework can be translated into hardware implementations using a content addressable memory (CAM) such as ternary content-addressable memory (TCAM). The result vector can be used to look up the state-case pair that the result vector corresponds to, and the identified state-case pair can be used to determine the state transition and actions to take. Thus, standardizing a format for the conditions and actions, and organizing conditions per state using the hierarchical match action table framework can allow hardware and software implementations to be developed with greater consistency. The hierarchical match action table based implementation can support hardware acceleration, and can be deployed using automatic microcode compilation.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an integrated circuit (IC) device 100 that can perform congestion control according to some embodiments.

The IC device 100 may include a metrics module 102, a congestion control state machine 104, and a comparison module 108. Congestion control state machine 104 can have various congestion control states. Transitions between the states can be managed by control circuitry implement based on a hierarchical match action table (MAT) framework 105. In some implementations, the IC device 100 can be a network device, e.g., a network interface card or a network controller. Multiple such network devices can be used to facilitate communication among various nodes (e.g., servers, computing systems, or processors) across a network to support different applications, such as, high performance computing, web hosting, machine learning, video gaming, artificial intelligence, computer vision, etc. The IC device 100 can be part of a system-on-a-chip (SoC), a field programmable gate array (FPGA), an application specific integrated circuit (ASIC), or another suitable device. Note that the IC device 100 may also include other or different components to support the functionality of the network interface card or network controller, which are not shown in FIG. 1.

The metrics module 102 may be operable to perform the measurements associated with the traffic on the network and derive network related metrics from the measurements. For example, the metrics module 102 may monitor the traffic on the network and collect the measurements at regular time intervals based on a suitable transport layer protocol. Some example transport layer protocols may include SRD transport protocol (sometimes referred to as Relaxed Reliable Datagram (RRD) protocol), TCP, or UDP. In some implementations, the measurements may be collected at the end of each phase, which can be multiple round-trip time of packets (e.g., 3× round-trip time of packets). In some implementations, the measurements may be performed by other component(s) of the network device, and the metrics module 102 may derive the network related metrics based on those measurements. The network related metrics may include latency metrics, rate metrics, and inflight metrics associated with the traffic on the network.

The latency metrics may include information associated with the RTT, the retransmission timeout, etc. An RTT for a packet may include the total time it takes for the packet to travel from the source to the destination, and the time it takes the source to receive an ack from the destination for the packet. In some implementations, an ack may represent an aggregated ack for a set of packets received by the destination, e.g., one ack packet can be sent for a set of data packets (every 4 or 8 data packets) received by the destination. In some examples, the information associated with the RTT may include an estimation of the RTT value computed by averaging the RTTs of all the packets that were transmitted in the measurement phase. The information associated with the retransmission timeout may include a count of the retransmission timeouts that occurred in the measurement phase. In some implementations, a retransmission timeout may occur upon expiration of a timer indicating that an ack was not received from the destination during that time, in response to a packet sent by the source.

The rate metrics may include information associated with the transmission rate of the packets, drop rate of the packets, or the ack rate. The information associated with the transmission rate of the packets may include the rate at which the packets were transmitted in the measurement phase. The information associated with the drop rate of the packets may be derived from the number of packets that were dropped in comparison to the number of packets transmitted in the measurement phase. For example, the dropped packets may include the packets that did not get a corresponding ack from the destination. The information associated with the ack rate may include the rate at which each packet was acknowledged by the destination in response to the number of packets sent by the source. For example, the ack rate may depend upon the number of data packets that are acknowledged by each ack packet.

The inflight metrics may include information associated with the packets inflight, or the bytes inflight. For example, the information associated with the packets inflight may include the number of packets that have been transmitted in the measurement phase but have not been acknowledged, and the information associated with the bytes inflight may include the number of bytes that have been transmitted in the measurement phase but have not been acknowledged.

The congestion control state machine 104 may include different states of congestion control, e.g., a slow-start state, a steady state, a probing-up state, and a draining state. In each state, the congestion control state machine 104 may be operable to perform congestion control by determining whether any thresholds or limits configured to detect different cases of congestion need to be updated based on the comparison of the network related metrics received from the metrics module 102 with different conditions associated with the current state. Different conditions may check for the transmission rate, drop rate, ack rate, inflight packets, inflight bytes, RTT, and/or other suitable attributes associated with the traffic to detect cases of congestion on the network.

The hierarchical match action table framework 105 may include a case definition table that contains a plurality of case entries corresponding to the plurality of states of the congestion control state machine 104. Each case entry may contain a state-case pair specifying a case of a particular state of the congestion control, a set of conditions designated for the case of the case entry, and a next state of the congestion control. The conditions may include corresponding limits or thresholds for the given state of the congestion control, which can be compared with the network related metrics to detect whether the limits or thresholds need to be updated to improve congestion. The congestion control state machine 104 may be operable to compare the received network related metrics with the conditions in the case definition table to look up a case entry for a current state of the congestion control. In some implementations, the conditions in the case definition table may be defined in condition tables to detect whether certain network related metrics are zero, acceptable (or normal), high, low, or don't care. For example, the conditions can be defined to check whether the TX rate is normal or lower than expected, the drop rate is zero, low, or high, the ack rate is normal, high, or low, the inflight is normal, low, or high, the RTT is normal or high, or check the previous state, if the case depends on the previous state. The same condition can have different criteria for each state-case pair. Fr example, what is considered a normal TX rate can be different, depending on the state of congestion control and the case within that state.

In some implementations, each condition may be specified using a predefined form to allow compatibility between hardware and software implementations. For example, different conditions may be defined in the form of X*2^n [<|<=|>|>=]Y*(2^n [+|−]1). X and Y can be a subset of the basic inputs or derived inputs for a specific state-case pair. The basic inputs can include the received metrics in the current state, and current thresholds or configurations. The derived inputs can be derived from the basic inputs using simple calculations (e.g., average calculation) with or without constant values, e.g., to determine estimations of the rate or inflight. The value of n can be 0 to allow simple comparisons, or non-zero (e.g., 1 to 10) to allow comparisons with a margin.

Techniques described herein may use common code structure and parameters between software and hardware implementations that can allow hardware implementation using microcode. For example, each case entry in the case definition table can be implemented using a bit mask to select the relevant compare operations. A comparison module 108 may be operable to compare the network related metrics to each condition specified in the case definition table to generate a result vector 110. A bit mask corresponding to each case entry can be applied to the result vector 110 to identify a case entry that has its set of condition satisfied. In some implementations, the case definition table can also be implemented using a content addressable memory (e.g., TCAM). The result vector can be used to look up the state-case pair that the result vector corresponds to, and the identified state-case pair can be used to determine the state transition and actions to take.

Each state-case pair may also be associated with corresponding one or more congestion control actions to update network traffic goals and limits. The actions to take for each state-case pair can be specified in an action table for the particular state-case pair. Some example congestion control actions may include setting an inflight goal, setting an inflight limit, setting a round-trip time goal, setting a transmission rate goal, or setting a transmission rate limit. The congestion control state machine 104 may be further operable to update a state of the congestion control to a next state indicated in the identified case entry, and perform one or more congestion control actions corresponding to the case entry. The congestion control state machine 104 may be operable to transition between different states of congestion control based on the comparison, as described with reference to FIG. 2.

Figure 2:
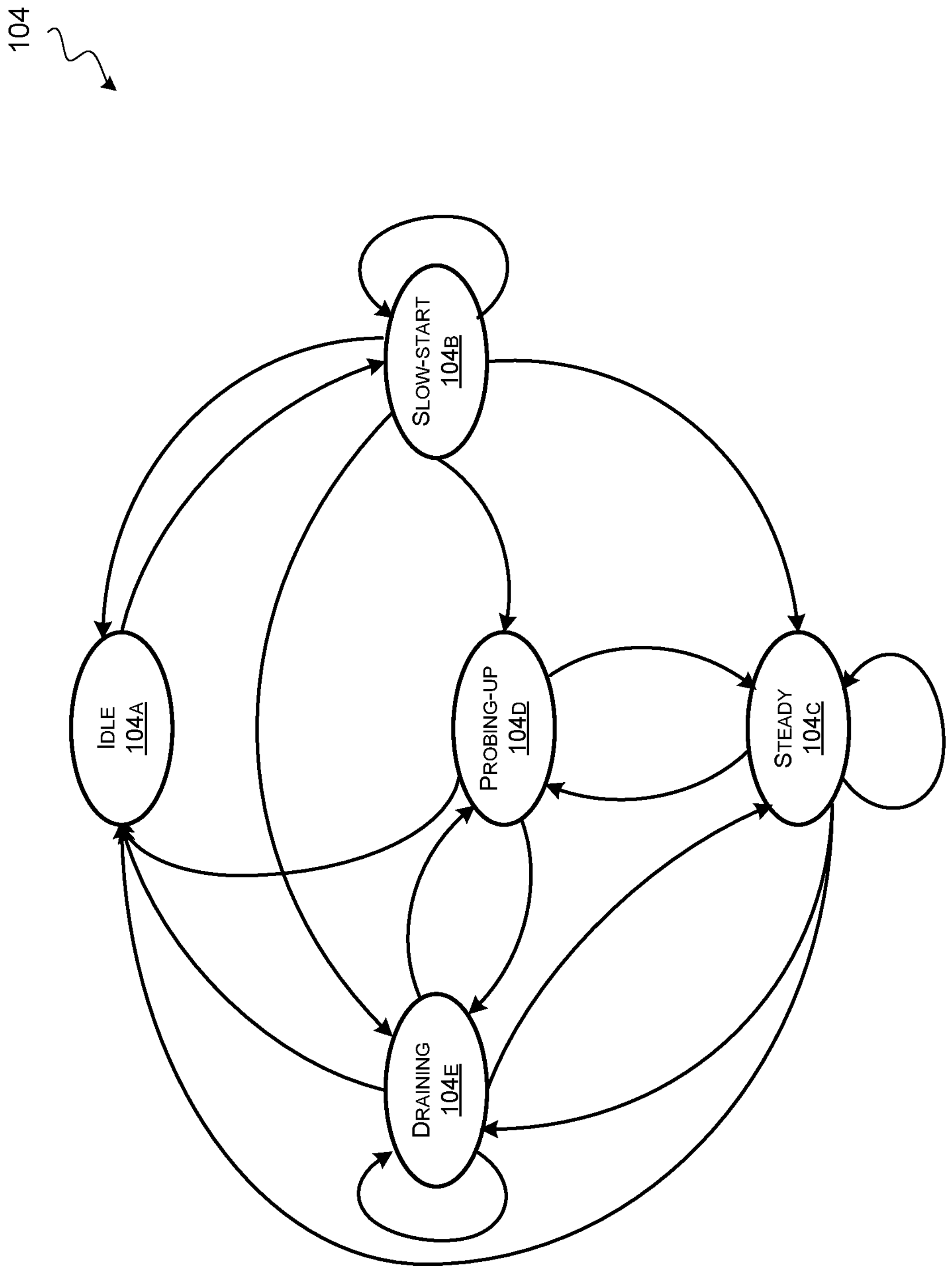
FIG. 2 illustrates an example of a congestion control state machine, according to some embodiments.

FIG. 2 illustrates an example of the congestion control state machine 104, according to some embodiments.

At reset, the congestion control state machine 104 may be in an idle state 104*a*. The congestion control state machine 104 may continue to be in the idle state 104*a* when there is no traffic on the network, e.g., there are no packets being transferred. The congestion control state machine 104 may transition to a slow-start state 104*b* when there is a small number of packets being transferred (e.g., low traffic). The congestion control state machine 104 may continue to be in the slow-start state 104*b* while the traffic stays low. The congestion control state machine 104 may transition to a steady state 104*c* as the traffic increases on the network, and may continue to stay in the steady state 104*c* while there is no network congestion. If the congestion builds up, e.g., due to high latency or rate, the congestion control state machine 104 may transition to a draining state 104*e* to slow down the rate to help reduce congestion.

In some instances, the congestion control state machine 104 may also transition to a probing-up state 104*d* from the slow-start state 104*b*, the steady state 104*c*, or the draining state 104*e* to probe whether reconfiguring any attributes like transmission rate would allow sending more packets without degrading the system performance. In the probing-up state 104*d*, the congestion control state machine 104 may determine whether reconfiguring certain attributes is increasing congestion, and may transition to the draining state 104*e* to attempt to reduce the congestion. The congestion control state machine 104 may transition from the draining state 104*e* back to the idle state 104*a* when there is no traffic. The congestion control state machine 104 may also be operable to transition from the slow-start state 104*b* to the draining state 104*e* before transitioning to the idle state 104*a*.

FIG. 3 illustrates an example implementation of a case definition table 106, according to some embodiments.

The case definition table 106 may include a plurality of rows corresponding to a plurality of state-case pairs. Each state-case pair may represent a case entry in the case definition table 106 that specifies a case 106*b* corresponding to a state 106*a* of the congestion control state machine 104. Each case entry may include a corresponding set of conditions 106*c*, and a next state 106*d* of the congestion control. The state 106*a* may include a slow-start state, a steady state, a state C, or a state D of the congestion control state machine 104. For example, the slow-start state, steady state, state C, and the state D may represent states of the congestion control state machine 104, e.g., the slow-start state 104*b*, steady state 104*c*, probing-up state 104*d*, or the draining state 104*e*. Note that the case definition table 106 may include additional or fewer states based on the implementation.

The example of the case definition table 106 in FIG. 3 shows a plurality of cases for each state 106*a*, and for each of the plurality of cases, Y number of conditions (cond) may be designated. For example, for the slow-start state, cond 11, cond 12, cond 13, . . . , and cond 1Y may be designated for case 1, and cond 21, cond 22, cond 23, . . . , and cond 2Y may be designated for case 2. For the steady state, cond 31, cond 32, cond 33, . . . , and cond 3Y may be designated for case 3, and cond 41, cond 42, cond 43, . . . , and cond 4Y may be designated for case 4. For state C, cond 51, cond 52, cond 53, . . . , and cond 5Y may be designated for case 5, and cond 61, cond 62, cond 63, . . . , and cond 6Y may be designated for case 6. For state D, cond 71, cond 72, cond 73, . . . , and cond 7Y may be designated for case 7, and cond 81, cond 82, cond 83, . . . , and cond 8Y may be designated for case 8. The next state 106*d* for each case of the state 106*a* may include one of the states of the congestion control state machine 104. Note that in some cases, the next state 106*d* can be the same as the current state 106*a*, as shown by the example of case 6 in FIG. 3.

In some implementations, each case from the case 106*b* may include a case name that represents the type of conditions being checked using that case entry for a specific use case. As an example, FIG. 3 also shows a "low packets inflight" case for the slow_start state that checks for the low inflight count, and a "dropped packets" case for the steady state when dropped packets are detected. Other scenarios or cases for each state can be defined in the case definition table 106.

Some example conditions for the "low packets inflight" case may include a normal transmission rate condition, and a low inflight packet count, while other metrics such as re-transmit rate and round-trip time can take on any value and are don't care for this state-case pair. The normal transmission rate condition may be used to determine whether the TX rate is acceptable in the given state. The low inflight packets condition may be used to determine whether the packets inflight are low in the given state.

In some implementations, each of the conditions for the plurality of case entries in the case definition table 106, and the actions corresponding to each case entry may be defined as a macro or a function that can allow standardizing the conditions and actions for different network related metrics, and provide compatibility between the software and hardware implementations. The case definition table 106 can be updated to reconfigure the parameters to modify the congestion control. Furthermore, different macros can be defined to check for high values, low values, 0 values, acceptable values, or any (don't care) value. An example of conditions to check the TX rate for an acceptable value is described with reference to FIG. 4.

FIG. 4 illustrates an example of a condition table for TX rate ok conditions 400 of different state-case pairs to detect whether the TX rate is acceptable, according to some embodiments.

The condition table 400 can be used to specify the normal transmission rate conditions that appear in the case definition table in FIG. 3 for different values of the state 106*a* and the case 106*b*. The normal transmission rate conditions 400 may be generated for different states using suitable functions with the TX rate limits that are configurable. As shown in FIG. 4, a normal transmission rate can be determined by checking the TX rate against different limits for different state-case pairs to determine whether the TX rate is acceptable or considered normal or ok for the particular state-case pair. Different limits for the TX rate can be used for different state-case pair to determine whether the TX rate is ok. For example, the different limits may include ">85%" to detect whether the TX rate is greater than or equal to 85% of the limit for the TX rate, ">70%" to detect whether the TX rate is greater than or equal to 70% of the limit for the TX rate, or ">90%" to detect whether the TX rate is greater than or equal to 90% of the limit for the TX rate. Note that the normal transmission rate condition may include other parameters and comparison with other limits as well based on the implementation, which are not shown in FIG. 4.

Similar checks can be used to determine whether the TX rate is zero, high, low, or don't care for different states of the congestion control. Thus, different criteria can be used to generate a plurality of conditions for various state-case pairs that include conditions to compare different rates (e.g., ack to limit, ack to TX, etc.), and check for inflight in bytes or packets, RTT, retransmits and timeouts, and low traffic load. Some functions may be used to generate conditions that depend on the previous state, or include randomness factor. The randomness factor can be used to increase or decrease the rate to determine how it affects the congestion on the network. Thus, standardizing the format of the conditions can allow better readability and maintenance of the code, as compared to using nested conditional statements.

FIG. 5 illustrates an example of an action table 500 that includes a plurality of actions for updating different parameters for different state-case pairs that can be used for congestion control, according to some embodiments.

The action table 500 may include a plurality of update rate actions that can be used to update different parameters associated with the rates, e.g., the TX rate, ack rate, etc., for different state-case pairs. For example, the TX rate may be updated when the count of inflight packets or bytes is lower than the rate limit. Each update rate action may be used to update a parameter to a certain value or by a certain multiplier factor for the given state-case pair. Each update rate action may be associated with a case entry in the case definition table 106 given the state 106*a* and case 106*b*. As shown in FIG. 5, different parameters can be updated to a value or a multiplier to update the goals or limits for the rate. Similar actions may be defined for different congestion control actions to update the RTT goals, inflight goals, and/or inflight limits, etc.

Figure 6:
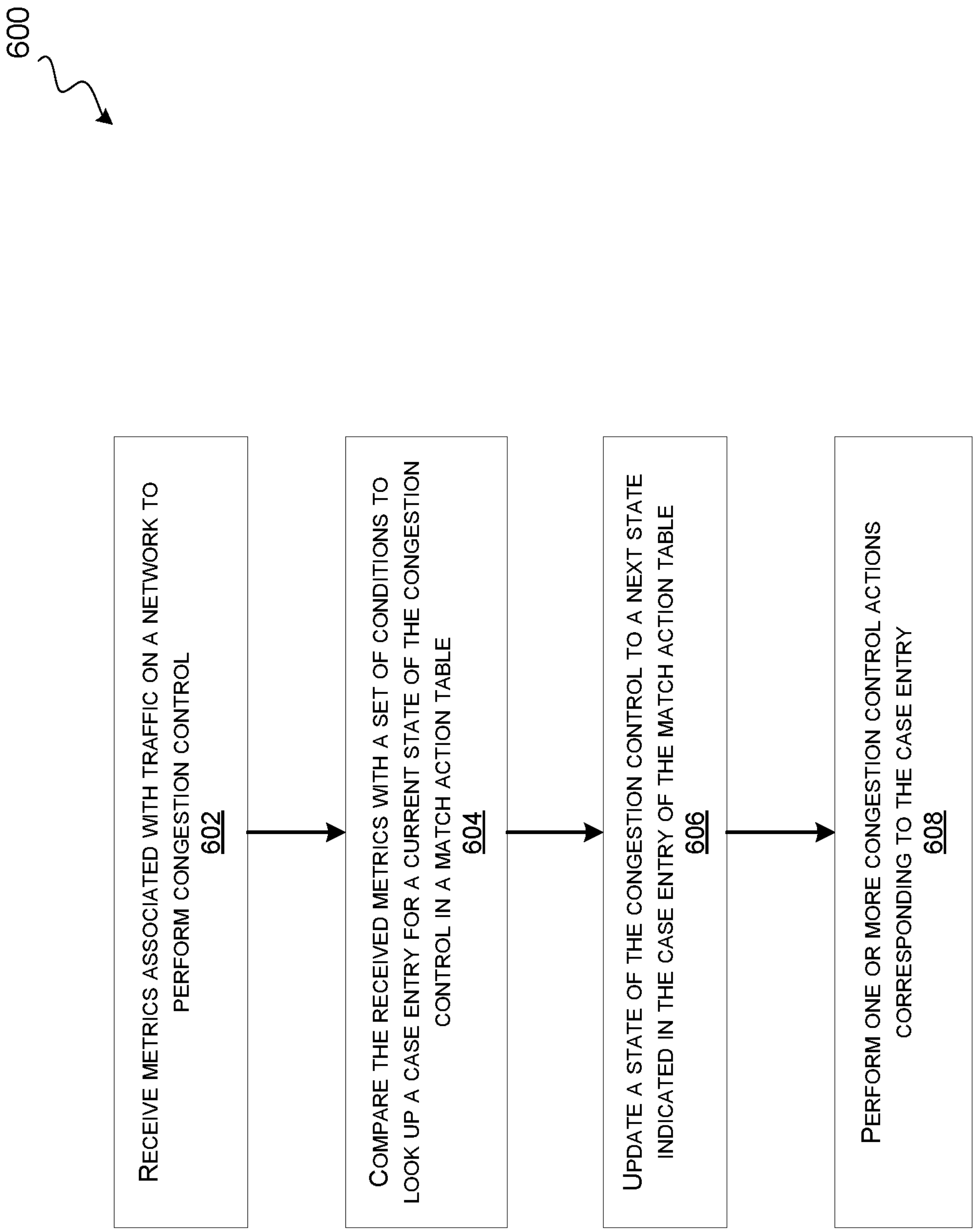
FIG. 6 illustrates a flow chart for a method to perform congestion control using a hierarchical match action table framework, according to some embodiments.

FIG. 6 illustrates a flow chart 600 for a method to perform congestion control using a hierarchical match action table framework, according to some embodiments. The method may be performed by the IC device 100 in FIG. 1. In some examples, the IC device 100 can be a network device.

In step 602, the method includes receiving metrics associated with traffic on a network to perform congestion control. For example, the congestion control state machine 104 may receive the metrics from the metrics module 102. The metrics associated with the traffic may comprise latency metrics, rate metrics, and inflight metrics. The latency metrics may include one or more of RTT information, or a retransmission timeout information. The rate metrics may include one or more of transmission rate information, packet drop rate information, or acknowledgement rate information. The inflight metrics may include one or more of bytes inflight information, or packets inflight information. The congestion control may include the slow-start state 104*b*, steady state 104*c*, probing-up state 104*d*, and the draining state 104*e*.

In step 604, the method includes comparing the received metrics with a set of conditions to look up a case entry for a current state of the congestion control in a case definition table of the hierarchical match action table framework. For example, the congestion control state machine 104 may compare the received metrics with a set of conditions to look up a case entry for a current state of the congestion control in the case definition table 106. The set of conditions may include one or more of a comparison of a transmission rate to a rate limit, a comparison of rate information specified for the identified case entry, a condition on bytes inflight, a condition on packets inflight, a condition on RTT, a condition on retransmission timeout, a condition on application limited status, a condition of a previous state of the congestion control, or a randomness factor. Each condition can be associated with a condition table of the hierarchical match action table framework that specifies the particular criteria to meet the conditions for each specific state-case pair. In some examples, the case entry can be identified by applying a bit mask corresponding to the case entry to the result vector 110.

As an example, the identified case entry may correspond to the "low packets inflight" case in the slow-start state of the congestion control state machine 104 that checks for low inflight count using the conditions 106*c* in the case definition table 106. For example, the conditions 106*c* for the "low packets inflight" case in the slow-start state may include normal transmission rate and low packets inflight, while re-transmission rate and round-trip time can take on any values, as shown in FIG. 3. As shown in FIG. 4, the normal transmission rate condition for the state-case pair corresponding to the slow-start state and "low packets inflight" case may determine whether the TX rate is greater than or equal to the 70% of the limit to indicate that the transmission rate is normal for this state-case pair. Similar condition tables can be used to specify the other conditions such as the condition for low inflight packets to determine what rate or count corresponds to having low inflight packets for this state-case pair.

As another example, the identified case entry may correspond to the "dropped packets" case in the steady state of the congestion control state machine 104. The conditions 106*c* for the "dropped packets" case in the steady state may include a normal transmission rate, a high re-transmit rate, the inflight packets and round-trip time can take on any values, as shown in FIG. 3. As shown in FIG. 4, the normal transmission rate condition for the state-case pair corresponding to the steady state and "dropped packets" case may determine whether the TX rate is greater than or equal to the 90% of the limit to indicate that the transmission rate is normal for this state-case pair. Similar condition tables can be used to specify the other conditions such as the condition for high re-transmit rate to determine what re-transmit rate is considered high for this state-case pair.

In step 606, the method includes updating a state of the congestion control to a next state indicated in the case entry of the match action table. For example, the congestion control state machine 104 may update a state of the congestion control to a next state indicated in the case entry of the case definition table 106. For the example of the "low packets inflight" case in the slow-start state, the next state 106*d* may continue to be in the slow-start state in the case definition table 106. For the example of the "dropped packets" case in the steady state, the next state 106*d* may be updated to the draining state in the case definition table 106.

In step 608, the method includes performing one or more congestion control actions corresponding to the case entry. The congestion control state machine 104 may perform one or more congestion control actions corresponding to the case entry. The one or more congestion control actions may include one or more of setting an inflight goal, setting an inflight limit, setting a RTT goal, setting a transmission rate goal, or setting a transmission rate limit. In some examples, the update rate function can be used to update a limit or a goal of the transmission or ack rate, as described with reference to the action table 500 in FIG. 5. For example, different state-case pairs can update the rate using different parameters and values (e.g., rate multipliers). Thus, as described above, standardizing conditions and actions, and organizing conditions per state using the match action table can allow hardware and software implementations with consistent performance.

Figure 7:
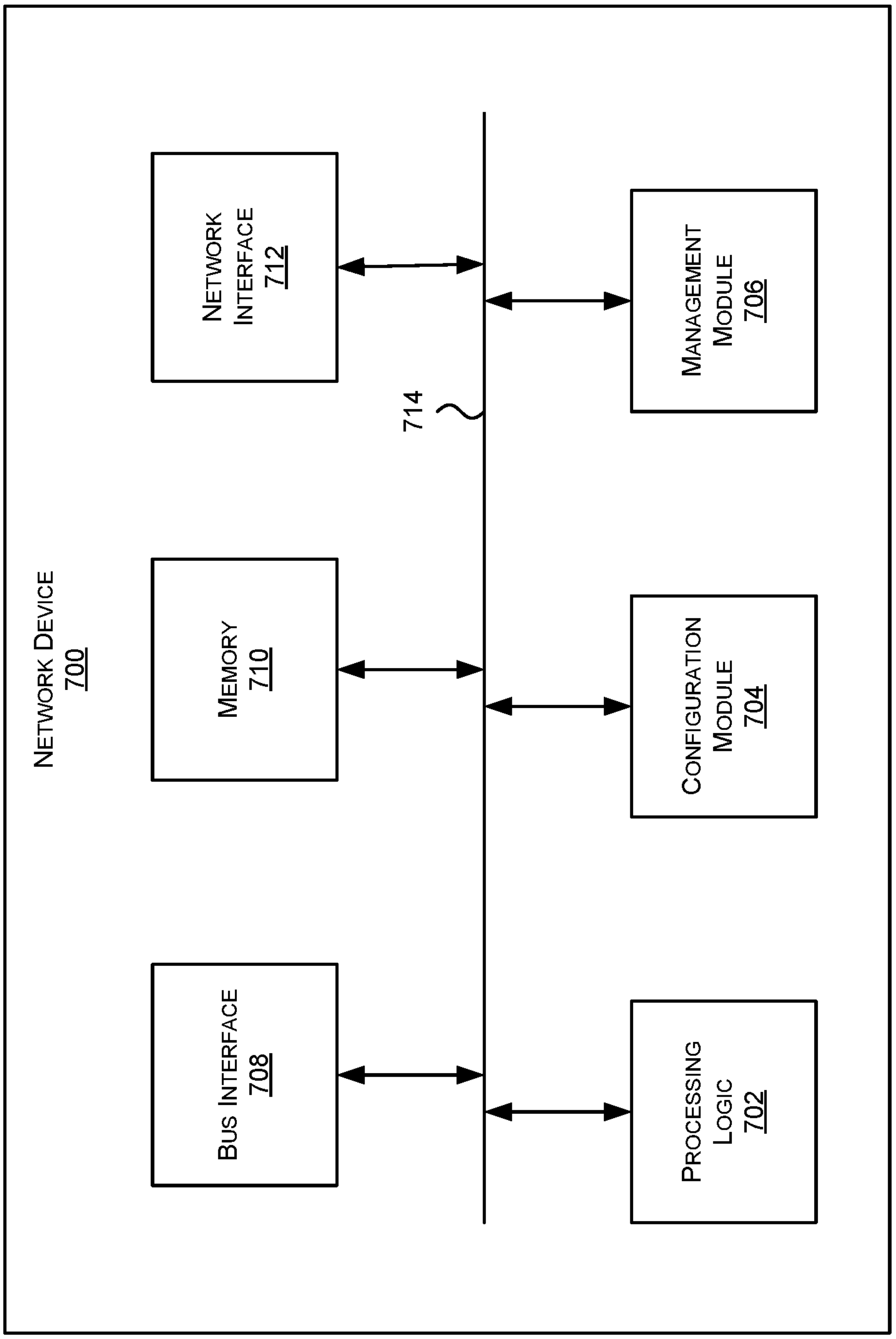
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. In some examples, the network device 700 may include components of the IC device 100 to perform congestion control based on the MAT 106. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
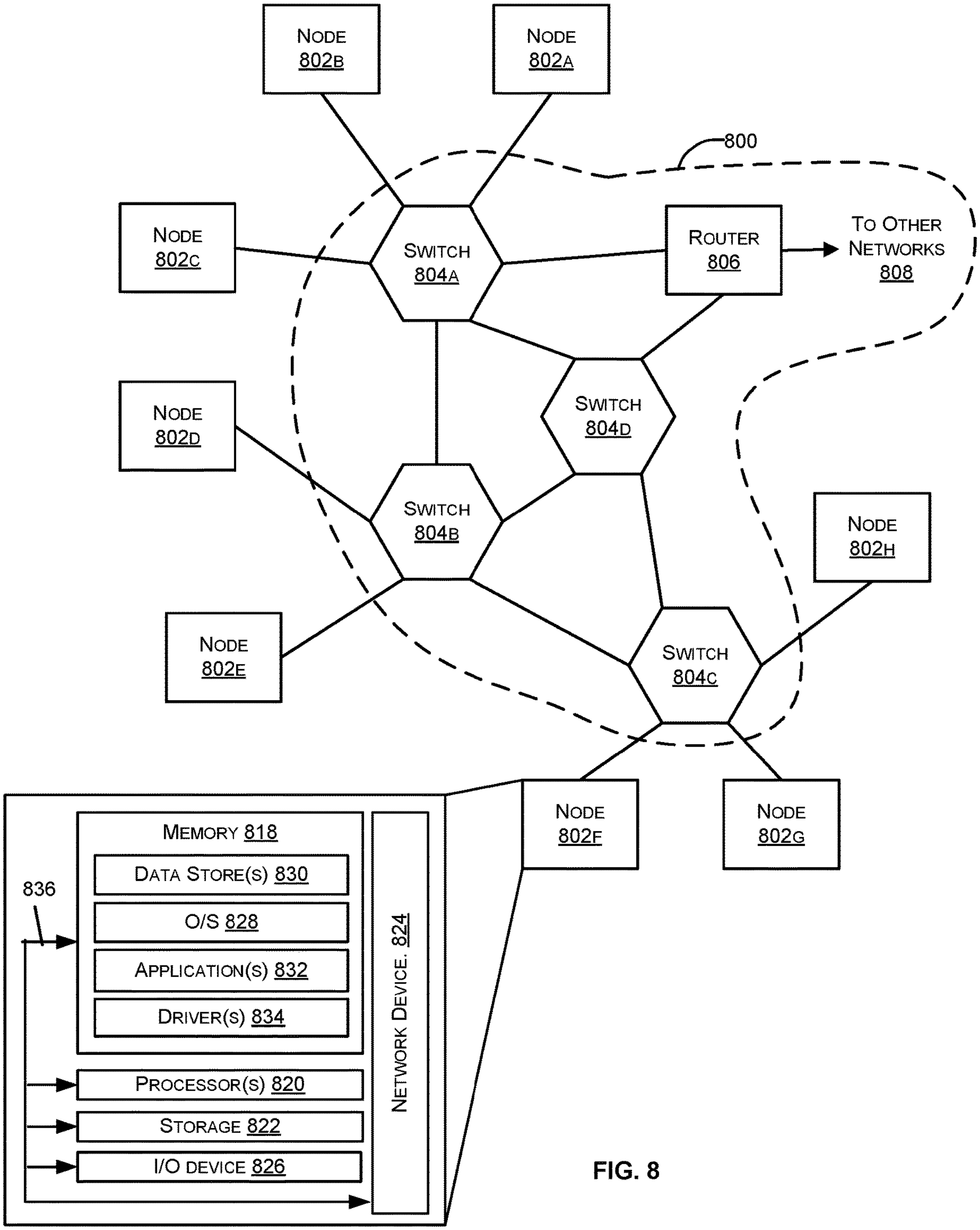
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804*a*-804*d*, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804*a*-804*d* may be connected to a plurality of nodes 802*a*-802*h* and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804*a*-804*d* and router 806, if present, may be referred to as a switch fabric, a fabric, a network fabric, or simply a network. In the context of a computer network, terms "fabric" and "network" may be used interchangeably herein.

Nodes 802*a*-802*h* may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802*a*-802*h* may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802*a*-802*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802*a*-802*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802*a*-802*h* may also include I/O device(s) 826, such as a keyboard, a mouse, a pen, a voice input device, a touch input device, a display, speakers, a printer, and the like. The node(s) 802*a*-802*h* may also include one or more communication channels 836. A communication channel 836 may provide a medium over which the various components of the node(s) 802*a*-802*h* can communicate. The communication channel or channels 836 may take the form of a bus, a ring, a switching fabric, or a network.

The node(s) 802*a*-802*h* may also contain network device(s) 824 that allow the node(s) 802*a*-802*h* to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A non-transitory computer readable medium storing program code that, when executed by one or more processors, causes the one or more processors to perform operations for congestion control in a computer network, the operations comprising:

receiving network related metrics including latency metrics, rate metrics, and inflight metrics associated with traffic on the network;

comparing the received network related metrics with a plurality of conditions to identify a case entry in a case definition table of a hierarchical match action table framework, wherein the case definition table contains a plurality of case entries for each of a plurality of states of the congestion control including a slow-start state, a steady state, a probing state, and a draining state, and wherein each case entry contains a state-case pair specifying a case of a particular state of the congestion control, a set of conditions designated for the case of the case entry, and a next state of the congestion control, wherein each condition is defined for a state-case pair in one or more condition tables of the hierarchical match action table framework;

updating a state of the congestion control to the next state indicated in the identified case entry; and performing a set of congestion control actions to update network traffic goals and limits corresponding to the state-case pair of the identified case entry based on one or more action tables of the hierarchical match action table framework.

2. The non-transitory computer readable medium of claim 1, wherein the network related metrics are received at an end of each measurement phase.

3. The non-transitory computer readable medium of claim 1, wherein each measurement phase is taken over a multiple of round-trip time of packets.

4. A method, comprising:

receiving metrics selected from one or more of latency metrics, rate metrics, or inflight metrics associated with traffic on a network to perform congestion control;

comparing the received metrics with conditions in a hierarchical match action table framework to look up a case entry for a current state of the congestion control, the hierarchical match action table framework having a case definition table and a set of condition tables, wherein the case definition table contains a plurality of case entries for each of a plurality of states of the congestion control, wherein each case entry contains a state-case pair specifying a case of a particular state of the congestion control, a set of conditions designated for that case entry, and a next state of the congestion control, and wherein the set of conditions includes a condition that references a condition table in the set of condition tables to provide respective criteria for different state-case pairs to satisfy the condition;

updating a state of the congestion control to a next state indicated in the case entry; and performing one or more congestion control actions corresponding to the case entry.

5. The method of claim 4, wherein the metrics associated with the traffic comprise latency metrics including one or more of round-trip time information, or a retransmission timeout information.

6. The method of claim 4, wherein the metrics associated with the traffic comprise rate metrics including one or more of transmission rate information, packet drop rate information, or acknowledgement rate information.

7. The method of claim 4, wherein the metrics associated with the traffic comprise inflight metrics including one or more of bytes inflight information, or packets inflight information.

8. The method of claim 4, wherein the set of conditions includes one or more of a comparison of a transmission rate to a rate limit, or a comparison of rate information specified for the case entry.

9. The method of claim 4, wherein the set of conditions includes one or more of a condition on bytes inflight, or a condition on packets inflight.

10. The method of claim 4, wherein the set of conditions includes one or more of a condition on round-trip time, or a condition on retransmission timeout.

11. The method of claim 4, wherein the set of conditions includes one or more of a condition on application limited status, a condition of a previous state of the congestion control, or a randomness factor.

12. The method of claim 4, wherein one or more of the conditions are set to a don't care value.

13. The method of claim 4, wherein the one or more congestion control actions include one or more of setting an inflight goal, setting an inflight limit, setting a round-trip time goal, setting a transmission rate goal, or setting a transmission rate limit.

14. The method of claim 4, wherein the congestion control includes a slow-start state, a steady state, a probing-up state, and a draining state.

15. The method of claim 4, wherein the next state indicated in the case entry is the current state.

16. The method of claim 4, further comprising modifying the congestion control by updating one or more tables in the hierarchical match action table framework.

17. An integrated circuit (IC) device comprising:

a congestion control state machine having a plurality of states of congestion control, and control circuitry translated from a hierarchical match action table framework having a case definition table defining a plurality of case entries for the plurality of states of the congestion control, wherein each case entry corresponds to a case of a particular state of the congestion control, and wherein each case entry contains a set of conditions designated for the case of the case entry, and a next state of the congestion control, wherein the congestion control state machine is operable to:

obtain a result vector containing results of comparing network related metrics to each condition specified in the case definition table;

identify a case entry having its set of condition satisfied based on the result vector; and update a state of the congestion control to the next state indicated in the identified case entry.

18. The IC device of claim 17, wherein the congestion control state machine is operable to perform a set of congestion control actions to update network traffic goals and limits corresponding to the identified case entry.

19. The IC device of claim 17, wherein the set of conditions includes one or more of a comparison of a transmission rate to a rate limit, a comparison of rate information specified for the identified case entry, a condition on bytes inflight, a condition on packets inflight, a condition on round-trip time, a condition on retransmission timeout, a condition on application limited status, a condition of a previous state of the congestion control, or a randomness factor.

20. The IC device of claim 17, wherein the plurality of states of congestion control includes a slow-start state, a steady state, a probing-up state, and a draining state.

* * * * *